(12) United States Patent
Bigolin

(10) Patent No.: US 7,044,540 B2
(45) Date of Patent: May 16, 2006

(54) SADDLE MADE OF COMPOSITE MATERIAL, IN PARTICULAR FOR A BICYCLE

(75) Inventor: Riccardo Bigolin, San Zenone degli Ezzelini (IT)

(73) Assignee: Selle Royal, S.p.A., Pozzoleone (IT)

( * ) Notice: Subject to any disclaimer, the term of this patent is extended or adjusted under 35 U.S.C. 154(b) by 21 days.

(21) Appl. No.: 10/276,009

(22) PCT Filed: Jul. 27, 2001

(86) PCT No.: PCT/IB01/01352

§ 371 (c)(1),
(2), (4) Date: Nov. 12, 2002

(87) PCT Pub. No.: WO02/12056

PCT Pub. Date: Feb. 14, 2002

(65) Prior Publication Data

US 2003/0164629 A1 Sep. 4, 2003

(51) Int. Cl.
*B60N 2/38* (2006.01)

(52) U.S. Cl. ............. 297/195.1; 297/202; 297/452.14; 297/201; 297/214; 297/452.22

(58) Field of Classification Search ............ 297/195.1, 297/202, 201, 197, 452.22, 452.26, 452.27, 297/452.14, 452.15, 440.11, 452.56, 452.48
See application file for complete search history.

(56) References Cited

U.S. PATENT DOCUMENTS

| | | | |
|---|---|---|---|
| 3,604,748 A | | 9/1971 | Lamkemeyer |
| 4,155,590 A | | 5/1979 | Cunningham |
| 4,850,643 A | * | 7/1989 | Rollman ..................... 297/214 |
| 5,147,685 A | * | 9/1992 | Hanson ....................... 428/189 |
| 5,244,251 A | * | 9/1993 | Bourla ......................... 297/199 |
| 5,252,373 A | * | 10/1993 | Ganske et al. ................ 428/68 |
| 5,330,249 A | * | 7/1994 | Weber et al. ................ 297/214 |
| 5,348,369 A | * | 9/1994 | Yu .............................. 297/214 |
| 5,356,205 A | * | 10/1994 | Calvert et al. ......... 297/452.41 |
| 5,364,160 A | * | 11/1994 | Fritschen et al. ........ 297/195.1 |
| 5,670,232 A | * | 9/1997 | Bigolin ....................... 428/71 |
| 5,695,241 A | | 12/1997 | Olsen et al. |
| 5,904,396 A | | 5/1999 | Yates |
| 6,059,368 A | * | 5/2000 | Stumpf et al. ......... 297/440.11 |
| 6,131,994 A | * | 10/2000 | Yates .......................... 297/214 |
| 6,149,230 A | * | 11/2000 | Bontrager ................... 297/202 |
| 6,193,318 B1 | * | 2/2001 | Becker et al. ......... 297/452.49 |
| 6,231,122 B1 | * | 5/2001 | Goldstein ................ 297/195.1 |
| 6,260,918 B1 | * | 7/2001 | Lee .......................... 297/195.1 |
| 6,386,634 B1 | * | 5/2002 | Stumpf et al. ........... 297/300.4 |

(Continued)

FOREIGN PATENT DOCUMENTS

DE  40 33 634 A  4/1992

(Continued)

*Primary Examiner*—Peter M. Cuomo
*Assistant Examiner*—Erika Garrett
(74) *Attorney, Agent, or Firm*—R. Neil Sudol; Henry D. Coleman; William J. Sapone

(57) ABSTRACT

Saddle made of composite material, in particular for a bicycle, which comprises a support structure (2) provided with a padding (3) having, associated above it, a seating surface (7). The support structure (2) comprises a plurality of first layers (8) of high-rigidity composite material having an opening (11) formed centrally therein and a second layer (9) of composite material with a rigidity less than that of the first layers (8), fixed to the latter along a superimposed surface covering the opening (11) so as to form an elastically yielding zone which is preferably located in the prostatic and ischiatic zones of the seat (7) of the saddle (1).

11 Claims, 3 Drawing Sheets

U.S. PATENT DOCUMENTS 6,450,572 B1 * 9/2002 Kuipers ............... 297/195.1
6,666,507 B1 * 12/2003 Ringgard ............. 297/195.1
6,669,283 B1 * 12/2003 Yu ..................... 297/215.16

FOREIGN PATENT DOCUMENTS

WO          92 18373 A    10/1992

* cited by examiner

SADDLE MADE OF COMPOSITE MATERIAL, IN PARTICULAR FOR A BICYCLE

TECHNICAL FIELD

The present invention relates to a saddle made of composite material, in particular for a bicycle, and to a method for the manufacture thereof.

BACKGROUND ART

As is known, saddles of the more conventional type are generally composed of a shaped, rigid or semi-rigid body which forms the support structure of the saddle and is referred to, in the technical jargon of the sector, by the name of "shell", and of a padding which is arranged on top of the shell and generally consists of an expanded elastomer material such as, for example, polyurethane with or without the addition of material in the form of a gel. The shell also has, mounted underneath it, fixing means for ensuring the connection of the saddle with the frame of the bicycle. These means normally comprise a shaped bar (or a pair of shaped bars) fixed to the saddle mounting tube by means of clamps.

The padding of the saddle is generally lined with a fabric, leather or other material which essentially performs the function of ensuring a greater seating comfort for the cyclist.

As is known, in the bicycle sector, for some time there has been a particularly pressing need to provide saddles which are at the same time comfortable, i.e. are able to ensure seating comfort, and light so as not to penalize excessively the cyclist's performance.

In order to provide saddles which are particularly light, saddles without padding have been manufactured recently, said saddles being essentially composed of the support structure alone which is integrally made of particularly strong and light materials such as, for example, composite materials consisting of carbon fibres bonded together in resin matrices.

These saddles, although being extremely light and having a good mechanical strength, in practice have proved to be excessively uncomfortable owing to the limited elasticity of the seat.

In order to improve the comfort of cyclists, more recently thin paddings have been mounted on top of the carbon-fibre seats, although these still have been unable to solve entirely the problem of excessive lack of comfort.

Alternatively, already known saddles envisage the use of a padding which is composed of several layers of material with varying elasticity (including also gel) which are suitably arranged in the various zones of the seating surface above the support structure which is made of rigid or semi-rigid plastic material (for example polypropylene) with a substantially constant cross-section. In this way, the distribution of the pressures over the whole of the seating surface of the saddle has been significantly improved, thereby benefiting the comfort of the cyclist, but greatly penalizing the overall lightness of the saddle.

At present, therefore, the problem of providing a saddle which is both comfortable and extremely light has not been entirely solved.

In particular, hitherto the function of optimising the seating comfort has been attributed entirely to the padding and the function of reducing, where possible, the overall weight of the saddle has been attributed to the support structure.

U.S. Pat. No. 3,604,748 discloses a bicycle saddle of composite material according to the preamble of claim 1. However, such prior bicycle saddle has a rather rigid support structure of reduced comfort and relatively high weight.

DISCLOSURE OF THE INVENTION

The main object of the present invention is therefore that of eliminating the drawbacks of the abovementioned art by providing a saddle made of composite material—in particular for bicycles—which is extremely light and has a very comfortable seating surface.

Another object of the present invention is in particular that of providing a saddle which is constructionally simple and operationally entirely reliable.

A further object of the present invention is that of providing a simple and low-cost method for producing a comfortable and light saddle.

These objects, along with others, are all achieved by a saddle, in particular for a bicycle, which in accordance with claim 1, comprises a support structure provided with a padding having, associated above it, a seating surface, said support structure comprising at least one first layer of composite material and at least one second layer of composite material having a form different form that of said first layer and fixed thereto along a superimposed surface of said layers, to define portions with varying rigidity on said support structure, characterized in that it comprises a plurality of first layers which are superimposed and fixed together, each of said first layers defining at least one opening inside which said second layer is located so as to provide an elastically yielding zone.

By virtue of the above arrangement according to the invention it has been possible to combine the features of comfort and lightness in a single saddle.

BRIEF DESCRIPTION OF THE DRAWINGS

Further features and advantages of the invention will be more clearly understood from the detailed description of a preferred embodiment of the saddle which follows, furnished by way of non-limiting example with the assistance of the accompanying drawings in which.

DETAILED DESCRIPTION OF THE PREFERRED EMBODIMENTS

In accordance with the figures of the accompanying drawings, 1 denotes in its entirety the saddle forming the subject of the present invention.

Below reference will be made, for the sake of simplicity of the description, to a saddle for bicycles, it being understood, however, that it may also be mounted on cycles, motorcycles or other vehicles of any kind.

The saddle 1 is essentially composed of a rigid or semi-rigid frame 2 forming the support structure of the saddle and referred to in the technical jargon of the sector by the name of "shell", and of an elastically yielding padding 3 mounted on top of the shell 2 and consisting preferably of an expanded elastomer material.

Preferably the padding 3 is made using an expanded elastomer material (polyurethane) with or without injection of material in gel form and is covered with a lining of fabric, leather or other material able to limit the amount of sweating of the cyclist.

Figure 1:
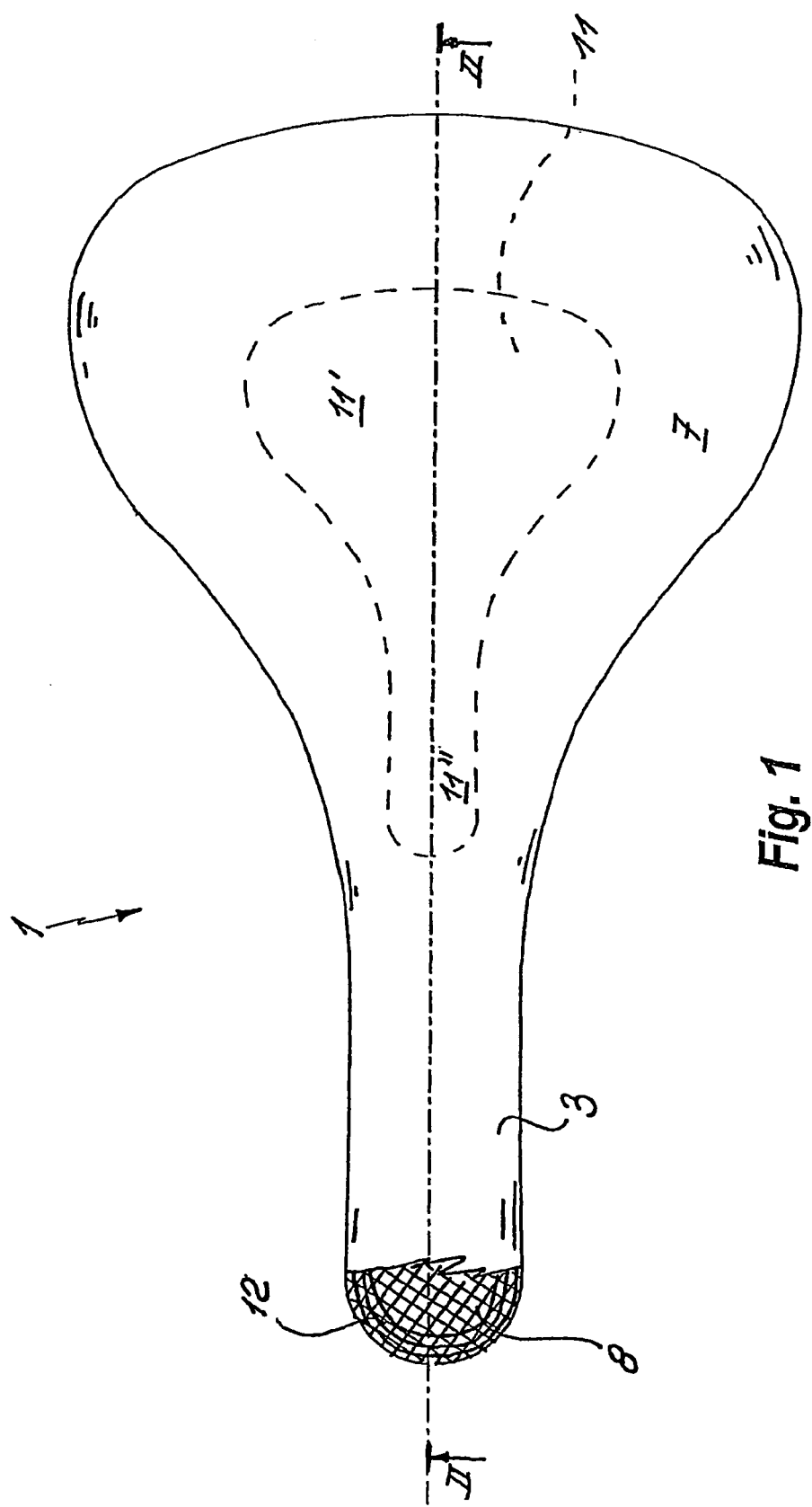
FIG. 1 shows a plan view of the saddle according to the present invention with some parts removed so that others may be seen more clearly.
Figure 2:
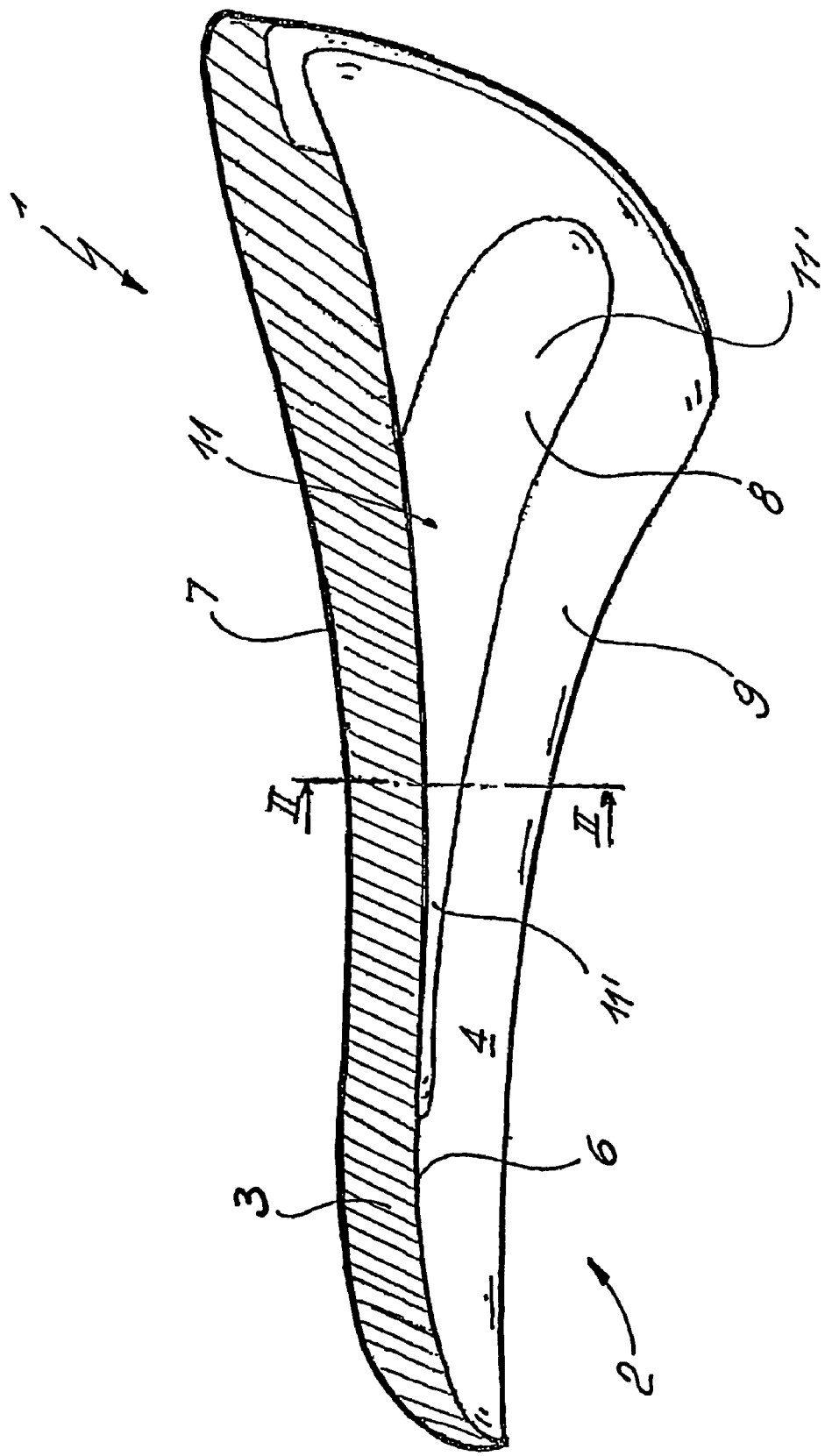
FIG. 2 shows a cross-sectional side view of the saddle according to FIG. 1.

With particular reference to the accompanying FIG. 2, the shell 2 has a bottom surface 4 to which are connected fixing means able to ensure the connection of the saddle 1 with a support frame of the bicycle (not shown since of the type known per se) and an upper surface 6 onto which the padding 3 able to define at the top the seating surface 7 for the cyclist is fixed.

The fixing means, which are not shown in the accompanying figures, are generally obtained by means of a shaped bar which is folded onto itself (fork) or by means of a pair of shaped bars which are fixed to the saddle mounting tube by means of clamps.

Advantageously, these shaped bars will be made of carbon fibre and will have variable cross-sections, in particular a wider cross-section in the region of the saddle mounting tube in order to allow for the various tensional forces to which it is subject.

According to the invention, the support structure 2 is formed by means of one or more first layers 8 consisting of high-rigidity composite material and by means of a second layer 9 consisting of lower-rigidity composite material which is fixed to the first layer 8 along a superimposed surface 10. The first and the second layers 8 and 9 cover different areas and therefore define portions of varying rigidity.

More particularly, in accordance with a preferred embodiment of the present invention, the support structure 2 is composed of a plurality of first layers 8 each provided with an opening 11 located substantially in a central zone of the saddle 1. This opening 11 is covered only by the second lower-rigidity layer with a relatively high elasticity. Thus an elastically yielding zone is defined in the region of this opening 11.

Obviously, without departing from the scope of protection of the present invention, it will nevertheless be possible to cover the opening 11 with a first layer 8 instead of a second layer 9 with less rigidity since the elastic effect which can be associated with this zone may in any case be obtained owing to the smaller number of layers of composite material, i.e. to the reduced thickness of the support structure 2 in the region of this opening 11.

Advantageously, this elastically yielding zone is positioned in the prostatic zone of the seat 7 of the saddle 1 and/or in the ischiatic zones of the seat 7 of the saddle 1.

For this purpose, this elastically yielding zone may, for example, have a form comprising two rear lobes 11' located in the ischiatic zones of the seat 7 of the saddle 1 and a central lobe 11" extending in the prostatic zone of the seat 7 of the saddle 1.

Figure 3:
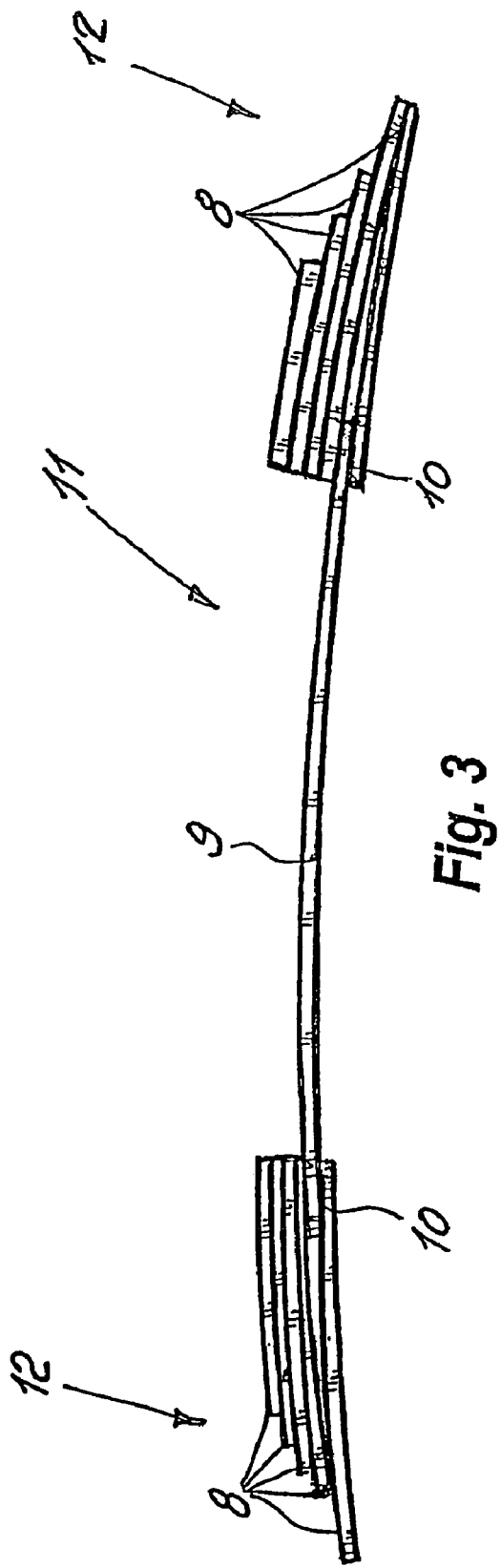
FIG. 3 shows in schematic form a side view, on a larger scale and cross-sectioned, of the support structure of the saddle according to FIG. 1.
Figure 4:
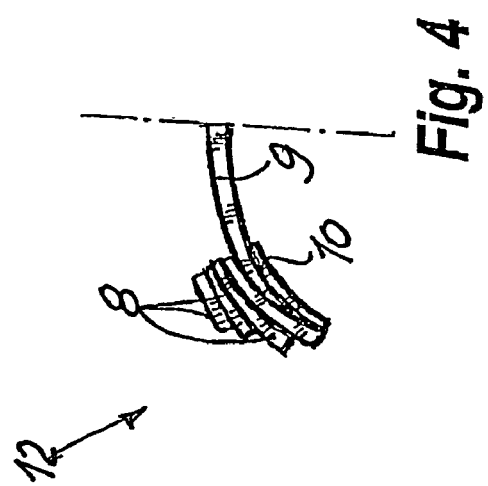
FIG. 4 shows in schematic form a cross-sectional view of the support structure along the line II—II of FIG. 2.

Structurally, as shown in the accompanying FIGS. 3 and 4, the first layers 8 have a substantially similar form and dimensions which become smaller layer-by-layer so as to create a support structure 2 of variable thickness, which is thinner along its peripheral edge.

In accordance with the example of embodiment illustrated in FIGS. 3 and 4, the second layer 9 is fixed between two first layers 8.

Constructionally the first layer 8 preferably consists of carbon fibres bonded to an epoxy matrix (and more generally composite-material fibres commonly called "high-modulus fibres"), while the second layer 9 consists of kevlar and polyester fibres bonded to a polyurethane-based matrix (and more generally composite-material fibres commonly called "high-elongation fibres"). In this way the first layer has a relatively high rigidity, while the second layer has a relatively high elasticity.

Advantageously, moreover, the fibres which make up the various first layers 8 may be oriented in variable directions in order to obtain the maximum mechanical performance.

In particular, for example, alternate first layers 8 with fibres oriented longitudinally, transversely and at 45° with respect to the longitudinal axis of the saddle may be envisaged.

The second layer 9 will have preferably a longitudinal orientation of the kevlar fibres and a transverse arrangement of the polyester fibres.

The present invention also relates to a method for the manufacture of a saddle 1 made of composite material, in particular for a bicycle, of the type comprising conventionally a step involving moulding, in a mould, of the polyurethane cover 3 on the support structure 2.

More particularly, a mould consisting of a male part, to which the support structure is applied, and a female part, which is suitable covered with a lining, is used during this step.

The abovementioned moulding step then envisages the insertion of polyurethane into the mould and closing of the latter.

According to the method in question, the manufacture of the support structure 2, intended to be inserted into the mould once formed, comprises a step involving hollow-punching of the first layers 8 made of fabric consisting of a high-rigidity composite material with simultaneous or subsequent formation of the opening 11 in each layer 8.

The various first layers 8 will preferably have dimensions which are slightly different and gradually decreasing, while maintaining the same central opening 11. For this purpose, hollow punches with a cutting blade defining different sections may be envisaged for example.

Similarly, hollow-punching of a second layer of fabric consisting of a composite material with a rigidity less than that of the first layer will also be envisaged, without, however, the formation of openings therein.

At this point, there will follow a step involving the superimposition, on top of each other, of the first layers 8 having different dimensions in such a way as to ensure that the central opening 11 is well-defined, creating a thinning effect along the edges.

Finally, there will follow a step involving the moulding and fixing of the various layers 8 and 9 inside a special mould by means of a thermosetting resin.

The first layers 8 are advantageously pre-impregnated with an epoxy resin which is able to cross-link rapidly at a temperature of between 70° and 100° C. The second layer 9 is also advantageously of the type pre-impregnated with resin (for example polyurethane) and therefore once the layers 8 and 9 have been placed in the mould, the latter is closed with a suitable pressure and, by means of heating and cooling means associated therewith, complete moulding of the support structure is performed.

Advantageously, during this mould forming step, the grooves and the lugs necessary for mounting subsequently the fixing means and in particular the shaped bars are also formed on the bottom surface 4 of the support structure 2.

In accordance with the example of embodiment illustrated in FIGS. 3 and 4, during the superimposition step, firstly a first layer 8 is arranged in the mould, then a second layer 9 is superimposed on this layer and the remaining first layers 8 are superimposed on the latter.

The mutual fixing of the layers inside the mould may be achieved as a result of the thermosetting resin with which the said layers are impregnated or by means of injection of resin inside the mould.

Advantageously the support structure 2, once extracted from the mould, may undergo finishing steps aimed at eliminating, for example, the presence of any burrs.

The invention thus conceived therefore achieves the preset objects.

Obviously, it may assume, in its practical embodiment, forms and configurations different from that illustrated above without, thereby, departing from the present scope of protection.

Moreover, all the details may be replaced by technically equivalent elements and the dimensions, the forms and the materials used may be of any nature depending on requirements.

The invention claimed is:

1. A saddle comprising:
    a support structure;
    a separate padding mounted on the top of said support structure and having, associated above it, a seating surface,
    said support structure comprising a plurality of superimposed first layers each made of a high-rigidity composite material including high-modulus fibers and having superimposed openings, said first layers being fixed to one another to form a unitary structure,
    said support structure further comprising at least one second layer made of a high-elasticity composite material including high-elongation fibers, said at least one second layer being imperforate and having a different form from said first layers and fixed thereto along a superimposed surface to define saddle portions with varying rigidity,
    said first layers and said at least one second layer being permanently molded and bonded together by a thermosetting or injected resin to form a unitary molded structure,
    said at least one second layer being interposed between two of said first layers to cover said superimposed openings so as to provide an elastically yielding zone.

2. Saddle according to claim 1, wherein said superimposed openings comprise two rear lobes which are located in the ischiatic zones of the seat of the saddle.

3. Saddle according to claim 1, wherein said superimposed openings comprise a central lobe arranged in the prostatic zone of the seat of the saddle.

4. Saddle according to claim 1, wherein at least one of said first layers is composed of carbon fibers bonded to an epoxy matrix.

5. Saddle according to claim 1, wherein said at least one second layer is composed of kevlar fibers bonded to a polyurethane-based matrix.

6. Saddle according to claim 1, wherein said at least one second layer is composed of kevlar and polyester fibers bonded to a polyurethane-based matrix.

7. Saddle according to claim 1, wherein said padding comprises a cover made of expanded elastomer material.

8. Saddle according to claim 7, wherein portions of material in gel form are arranged inside said cover of expanded elastomer material.

9. Saddle according to claim 1, wherein at least one of said first layers is composed with fibers oriented in a direction different from that of the longitudinal axis of the saddle.

10. Saddle according to claim 1, wherein said support structure is connected to a saddle mounting tube by means of at least one rod element made of carbon fiber.

11. Saddle according to claim 1, wherein said first layers have forms which are substantially similar, and dimensions which become smaller towards said padding.

* * * * *